3,077,383
PROCESS FOR THE PRODUCTION OF HYDRAZINE HYDRATE

Rudolf Mundil, Leverkusen, Germany, assignor to Farbenfabriken Bayer Aktiengesellschaft, Leverkusen, Germany, a corporation of Germany
No Drawing. Filed July 13, 1960, Ser. No. 42,498
Claims priority, application Germany July 15, 1959
8 Claims. (Cl. 23—190)

The present invention relates to the production of hydrazine hydrate and, more particularly, to a process wherein hydrazine is formed in the presence of a carbonyl compound.

It is known to produce hydrazine hydrate by heating a solution of sodium hypochlorite with an aqueous solution of ammonia, it being necessary to use the ammonia in excess. The reaction takes place in such manner that chloramine is formed in the first place from sodium hypochlorite and ammonia according to Equation 1:

$$NaOCl + NH_3 \rightarrow NH_2Cl + NaOH \qquad (1)$$

This chloramine then reacts further with excess ammonia to give hydrazine according to Equation 2:

$$NH_2Cl + NH_3 + NaOH \rightarrow N_2H_4 + NaCl + H_2O \qquad (2)$$

In this process, reaction (1) takes place instantaneously and is not dependent on the temperature and the presence of excess ammonia, whereas reaction (2) is a time reaction and only proceeds at an adequate velocity at elevated temperatures and when a relatively large excess of ammonia is present. Unfortunately, a secondary reaction (3) takes place concurrently with (2), this secondary reaction destroying the chloramine still present and hydrazine which has already formed and thus greatly reducing the yield, according to the equation:

$$2NH_2Cl + N_2H_4 \rightarrow 2NH_4Cl + N_2 \qquad (3)$$

It is possible to repress reaction (3) by adding size, gelatine or similar substances, thereby promoting reaction (2).

This synthesis discovered by Raschig is limited as regards its industrial economy by the fact that a very great excess of ammonia solution is required if a satisfactory yield of hydrazine is to be produced. The hydrazine is consequently formed in a very dilute aqueous solution, from which it must be subsequently recovered, and this involves a considerable expenditure of energy.

It is for this reason that over the course of time various attempts have been made to increase the yield of hydrazine or to obtain higher hydrazine concentrations with equal yields. For example, the synthesis solution, immediately after mixing the components, has been heated very rapidly under high pressure to temperatures of from 150 to 180° C. According to other processes, the operation has been carried out in two stages, in that the chloramine solution is first prepared according to Equation 1 accompanied by cooling and after adding a small excess of ammonia, this chloramine solution is thereafter reacted according to Equation 2 by adding a relatively large excess of ammonia.

It has been heretofore considered that acetone may be added to the reaction mixture obtained in accordance with the foregoing conventional synthesis of hydrazine for the purpose of separating hydrazine from dilute aqueous solutions. In certain cases this may be carried out under distillation conditions wherein the larger portion of the hydrazine is found in the aqueous distillate rather than in the residue. Moreover, certain reactive aldehydes and ketones may be used for the extraction recovery of the hydrazine content from dilute hydrazine solutions wherein an appropriate organic solvent is used for the extraction. Water-immiscible aldehydes and ketones may be additionally used directly as extractive solvents for the hydrazine content as well. Benzaldehyde has been used to precipitate the hydrazine content from very dilute solutions in order to recover the desired hydrazine. Nevertheless, none of these manipulative procedures has served to increase the content and yield of hydrazine hydrate from dilute aqueous solutions since these procedures are always employed after the completion of the conventional synthesis for forming the desired hydrazine.

In accordance with copending application Serial No. 787,816, a process is provided for the production of hydrazine from sodium hypochlorite solution and aqueous ammonia wherein the reaction takes place preferably in the presence of at least 2 mols of a carbonyl compound per mol of the hydrazine to be formed, said carbonyl compound being adapted to form a hydrazone or an azine with hydrazine. This process is carried out by mixing the reactants generally at room temperature and allowing the reaction to proceed over a period of several minutes at 50° C. In this way solutions are obtained having a calculated content of hydrazine hydrate with, for example, a 1.5% hydrazine concentration representing a 77% yield and a 2.6% hydrazine concentration representing a 52% yield.

According to the present invention, however, an improved process for the production of hydrazine from sodium hypochlorite solution and aqueous ammonia is proposed in which the reaction is similarly carried out in the presence of a carbonyl compound, the resulting hydrazone or azine is separated from the sodium chloride and the resulting aqueous solution is worked up to hydrazine, e.g., by decomposing the hydrazone or azine by means of an acid to the corresponding hydrazine salt and the free carbonyl compound.

Specifically, the reaction in accordance with the process of the invention takes place in the presence of a carbonyl compound which is able to form, with hydrazine, compounds of the hydrazone or azine type, such that the reactants are mixed as intensively as possible with one another and that the reaction temperature does not substantially exceed 25° C. but may be as high as 40° C. In accordance with this improved process, it is possible to obtain solutions having a hydrazine hydrate concentration of from 1.9 to 2% wherein yields are attained of the order of 94 to 98%.

Suitable carbonyl compounds for performing the invention are ketones and aldehydes of the general formula:

wherein $R_1$ stands for an alkyl group or hydrogen, $R_2$ means an alkyl group, and $R_1$ and $R_2$ together do not contain more than 5 carbon atoms, e.g., acetaldehyde, acetone, propionaldehyde, methylethylketone, diethylketone and cyclohexanone.

The amount of the carbonyl compound is preferably chosen so that at least two mols of the carbonyl compound are calculated per 1 mol of the hydrazine to be prepared.

According to the invention, when using the said process, the same yields of hydrazine can be obtained using a substantially smaller excess of ammonia or higher hydrazine yields can be obtained when using the same ammonia excess.

Example 1

200 ml. of bleaching liquor, containing 152 g. of active chlorine per liter, are diluted with 200 ml. of water and while being mixed as intensively as possible, are introduced into a solution consisting of 600 ml. of ammonia (25%), 10 ml. of size solution (0.1%) and 60 ml. of acetone. The heat evolved in the reaction is eliminated so that the temperature does not exceed 35° C. Immediately upon completion of the addition of the total amount of bleaching liquor a solution is obtained having a hydrazine proportion corresponding to 21.42 g. of hydrazine hydrate and a hydrazine hydrate concentration of 2.03%. Thus, the yield amounts to 98% calculated on the bleaching liquor used.

Care has to be taken that the intensive mixing operation is carried out to such an extent only and with a suitable agitator that the formation of gas bubbles in the solution does not occur.

*Example 2*

200 ml. of bleaching liquor, containing 152 g. of active chlorine per liter, are diluted with 200 ml. of water and while being mixed as intensively as possible, are introduced into a solution consisting of 600 ml. of ammonia (25%) and 60 ml. of acetone. The heat evolved in the reaction is lead off so that the temperature does not exceed 35° C. Immediately after completion of the addition of the total amount of bleaching liquor a solution is obtained having a hydrazine proportion corresponding to 20.55 g. of hydrazine hydrate and a hydrazine hydrate concentration of 1.99%. Thus, the yield amounts to 95% calculated on the bleaching liquor used. The omission of size solution allows to work up the reaction mixture by a substantially simpler method on a technical scale, since size-containing solutions readily give rise to foaming in distillation.

*Example 3*

200 ml. of bleaching liquor, containing 152 g. of active chlorine per liter, are diluted with 200 ml. of water at room temperature and while being mixed as intensively as possible, are introduced into a solution consisting of 600 ml. of ammonia (25%), 10 ml. of a size solution (0.1%) and 60 ml. of acetone. The heat evolved in the reaction is lead off so that the temperature does not exceed 40° C. Immediately upon completion of the addition of the total amount of bleaching liquor a solution is obtained having a hydrazine proportion corresponding to 20.55 g. of hydrazine hydrate and a hydrazine hydrate concentration of 1.97%. Thus, the yield amounts to 95% calculated on the bleaching liquor used.

*Example 4*

200 ml. of bleaching liquor, containing 152 g. of active chlorine per liter, are diluted with 200 ml. of water at room temperature and while being mixed as intensively as possible, are introduced into a solution consisting of 600 ml. of ammonia (25%), 10 ml. of a size solution (0.1%) and 60 ml. of acetone. The heat evolved in the reaction is lead off so that the temperature does not exceed 30° C. Immediately upon completion of the addition of the total amount of bleaching liquor a solution is obtained having a hydrazine proportion corresponding to 20.2 g. of hydrazine hydrate and a hydrazine hydrate concentration of 1.94%. Thus, the yield amounts to 93% calculated on the bleaching liquor used.

*Example 5*

In a multi-stage, e.g. four-stage, mixing process, bleaching liquor, containing 152 g. of active chlorine per liter, which is diluted with an equal volume of water, is continuously introduced into a solution of ammonia (25%) and acetone at a quantitative proportion of 44 parts of bleaching liquor+water, 54.3 parts of ammonia (25%) and 4.8 parts of acetone while intensively stirring. The heat evolved in the reaction is eliminated by cooling so that a temperature of 33–37° C. is obtained in each of the reaction vessels. The solution running off has a hydrazine concentration which corresponds to a hydrazine hydrate proportion of 1.86–1.98% calculated on the bleaching liquor used.

*Example 6*

200 ml. of bleaching liquor, containing 152 g. of active chlorine per liter, are diluted with 200 ml. of water at room temperature and while being mixed as intensively as possible, are introduced into a solution consisting of 600 ml. of ammonia (25%) and 10 ml. of size solution (0.1). The amount of heat evolved in the reaction is essentially lower than that in the preceding examples, and nitrogen starts to be developed in the solution from the resulting hydrazine according to the Raschig-decomposition reaction. The formation and decomposition of hydrazine occur concurrently. A sample immediately taken upon completion of the addition of bleaching liquor has a hydrazine hydrate proportion of 5.25 g. and a hydrazine hydrate concentration of 0.5%. Thus, the yield amounts to 24% calculated on the bleaching liquor used.

I claim:

1. Process for the production of hydrazine from sodium hypochlorite solution and aqueous ammonia which comprises intensively intermixing sodium hypochlorite and ammonia in the presence of a carbonyl compound of the general formula:

wherein $R_1$ represents a member selected from the group consisting of hydrogen and alkyl groups and $R_2$ is an alkyl group, wherein $R_1$ and $R_2$ taken together contain up to 5 carbon atoms, reacting the components of the mixture at a temperature up to 40° C., separating out the carbonyl compound-hydrazine reaction product thereby formed and converting the same to hydrazine.

2. Process according to claim 1 wherein the amount of the carbonyl compound is chosen so that at least two mols of the carbonyl compound are used per 1 mol of the hydrazine to be prepared.

3. Process according to claim 1 wherein said carbonyl compound is a member selected from the group consisting of acetaldehyde, acetone, propionaldehyde, methylethylketone, diethylketone and cyclohexanone.

4. Process according to claim 1 wherein said reaction product is converted to the corresponding hydrazine salt and carbonyl compound by treatment with acid.

5. Process as claimed in claim 1 wherein said reaction solution additionally contains a member selected from the group consisting of size and gelatine.

6. Process for the production of hydrazine from sodium hypochlorite solution and aqueous ammonia which comprises intensively intermixing sodium hypochlorite and ammonia in the presence of acetone, reacting the components of the mixture at a temperature up to about 35° C., separating out the dimethylketazine formed and converting the dimethylketazine to hydrazine.

7. Process as claimed in claim 6 wherein the amount of the carbonyl compound is chosen so that at least two mols of acetone are used per 1 mol of the hydrazine to be prepared.

8. Process as claimed in claim 6 wherein said reaction solution additionally contains a member selected from the group consisting of size and gelatine.

References Cited in the file of this patent

UNITED STATES PATENTS 2,993,758     Abendroth et al. _____ July 25, 1961

OTHER REFERENCES

Audrieth and Ogg, "The Chemistry of Hydrazine," J. Wiley and Sons, Inc., New York, 1951, pages 32 and 44.